(12) United States Patent
Van Staagen

(10) Patent No.: US 8,952,831 B2
(45) Date of Patent: Feb. 10, 2015

(54) ENHANCEMENT OF COCKPIT EXTERNAL VISIBILITY

(71) Applicant: Michael G. Van Staagen, Duluth, MN (US)

(72) Inventor: Michael G. Van Staagen, Duluth, MN (US)

(73) Assignee: Sikorsky Aircraft Corporation, Stratford, CT (US)

( * ) Notice: Subject to any disclaimer, the term of this patent is extended or adjusted under 35 U.S.C. 154(b) by 110 days.

(21) Appl. No.: 13/708,001

(22) Filed: Dec. 7, 2012

(65) Prior Publication Data

US 2014/0159926 A1 Jun. 12, 2014

(51) Int. Cl.
  *G08G 1/14* (2006.01)
  *G01C 23/00* (2006.01)
(52) U.S. Cl.
  CPC ................................ *G01C 23/00* (2013.01)
  USPC ................................ 340/971; 340/945; 701/3
(58) Field of Classification Search
  USPC ................................ 340/971, 945, 946; 701/3
  See application file for complete search history.

(56) References Cited

U.S. PATENT DOCUMENTS

| | | | |
|---|---|---|---|
| 6,343,863 B1 * | 2/2002 | Wood | 353/13 |
| 6,445,506 B1 * | 9/2002 | Eccles | 359/631 |
| 6,597,294 B1 * | 7/2003 | Ariens | 340/995.26 |
| 6,693,558 B2 * | 2/2004 | Hedrick | 340/971 |
| 6,946,976 B1 | 9/2005 | Langner et al. | |
| 7,271,960 B2 * | 9/2007 | Stewart et al. | 359/630 |
| 7,307,549 B2 * | 12/2007 | Firra | 340/974 |
| 7,928,863 B2 | 4/2011 | Firra | |
| 7,999,759 B2 | 8/2011 | Selbrede | |
| 8,339,284 B2 * | 12/2012 | He | 340/946 |
| 8,364,328 B2 * | 1/2013 | Hedrick | 701/3 |
| 8,485,486 B2 * | 7/2013 | Riedel et al. | 248/317 |
| 8,504,223 B2 * | 8/2013 | Boorman et al. | 701/14 |
| 2011/0226902 A1 * | 9/2011 | Giannelli et al. | 244/129.1 |
| 2013/0307705 A1 * | 11/2013 | Wang | 340/980 |

* cited by examiner

*Primary Examiner* — Eric M Blount
(74) *Attorney, Agent, or Firm* — Cantor Colburn LLP

(57) ABSTRACT

A cockpit display system for a cockpit of an aircraft includes a primary flight display moveably located in the cockpit and viewable from a pilot position and/or a copilot position in the cockpit. The primary flight display is movable from a first position utilized for a first operating condition of the aircraft to a second position to increase external visibility during a second operating condition of the aircraft. A cockpit system includes a pilot operating position and a first flight display moveably located in the cockpit and viewable from the pilot operating position. The first flight display is movable from a first position utilized during a first operating condition of the aircraft to a second position to increase external visibility from the pilot operating position during a second operating condition of the aircraft.

12 Claims, 5 Drawing Sheets

ENHANCEMENT OF COCKPIT EXTERNAL VISIBILITY

BACKGROUND OF THE INVENTION

The subject matter disclosed herein generally relates to helicopters or other aircraft. More specifically, the subject disclosure relates to operator visibility from a cockpit of an aircraft.

Cockpits of aircraft, in particular, helicopters, have three visual components: useful external view, avionics (displays and instrumentation), and remaining visual impairments (such as window posts and floor structure). The useful external view is provided by portions of windows forward of, to the side of, and in some cases below, crew member positions in the cockpit. Crew member, such as pilot and copilot, positions in the aircraft are equipped with avionics such as primary flight displays (PFD's) positioned forward of the crew member positions. The positions of the PFD's and other avionics are determined by regulations regarding Instrument Flight Rule (IFR) conditions. Such positioning, however, negatively impacts forward, downward, and cross-cockpit useful external view for the crew members during Visual Flight Rules (VFR) conditions, which occurs over 80% of the time, including takeoff and landing of the helicopter and when flying toward or near ground obstacles. Cross-cockpit visibility in particular, is blocked by the cross-cockpit crew member's PFD.

BRIEF DESCRIPTION OF THE INVENTION

According to one aspect of the invention, a cockpit display system for a cockpit of an aircraft includes a primary flight display moveably located in the cockpit and viewable from a pilot position and/or a copilot position in the cockpit. The primary flight display is movable from a first position utilized for a first operating condition of the aircraft to a second position to increase external visibility during a second operating condition of the aircraft.

According to another aspect of the invention, a cockpit system includes a pilot operating position and a first flight display moveably located in the cockpit and viewable from the pilot operating position. The first flight display is movable from a first position utilized during a first operating condition of the aircraft to a second position to increase external visibility from the pilot operating position during a second operating condition of the aircraft.

These and other advantages and features will become more apparent from the following description taken in conjunction with the drawings.

BRIEF DESCRIPTION OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

The detailed description explains embodiments of the invention, together with advantages and features, by way of example with reference to the drawings.

DETAILED DESCRIPTION OF THE INVENTION

Figure 1:
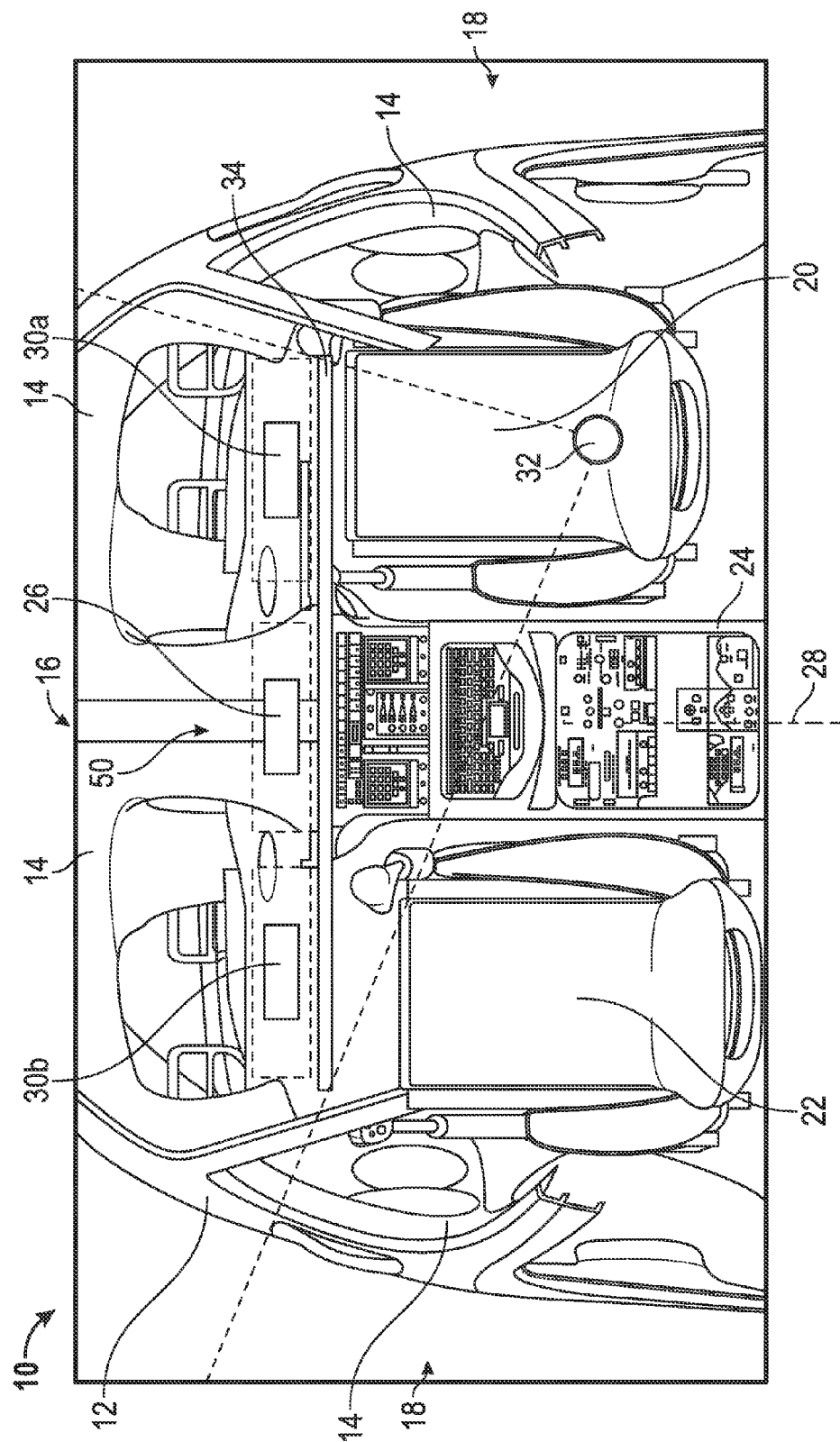
FIG. 1 is a schematic overhead view of an embodiment of a cockpit for an aircraft.

Shown in FIG. 1 is schematic overhead view of a cockpit 10 of an aircraft, for example a helicopter 12. The cockpit 10 includes windows 14 located at a front 16 and sides 18 of the cockpit 10. Two crew member positions, in this embodiment a pilot position 20 and a copilot position 22 are located in the cockpit 10, positioned in a side by side configuration. Although the embodiments herein are described with respect to this side by side configuration, one skilled in the art would appreciate that the present disclosure may be applied to other cockpit configurations, such as single seat configurations.

An cockpit display system 50 is located in the cockpit 10 and includes an instrument console 24 that is located between the pilot position 20 and the copilot position 22, and in some embodiments extends upwardly to include a multi-functional display (MFD) 26, or other panel located to be viewable from both the pilot position 20 and the copilot position 22. As shown, the MFD 26 is located along a cockpit central axis 28 extending between the pilot position 20 and the copilot position 22. In some embodiments, the MFD 26 is supported by the instrument console 24, while in other embodiments the MFD 26 may be a separate component independently mounted in the cockpit 10.

Figure 2:
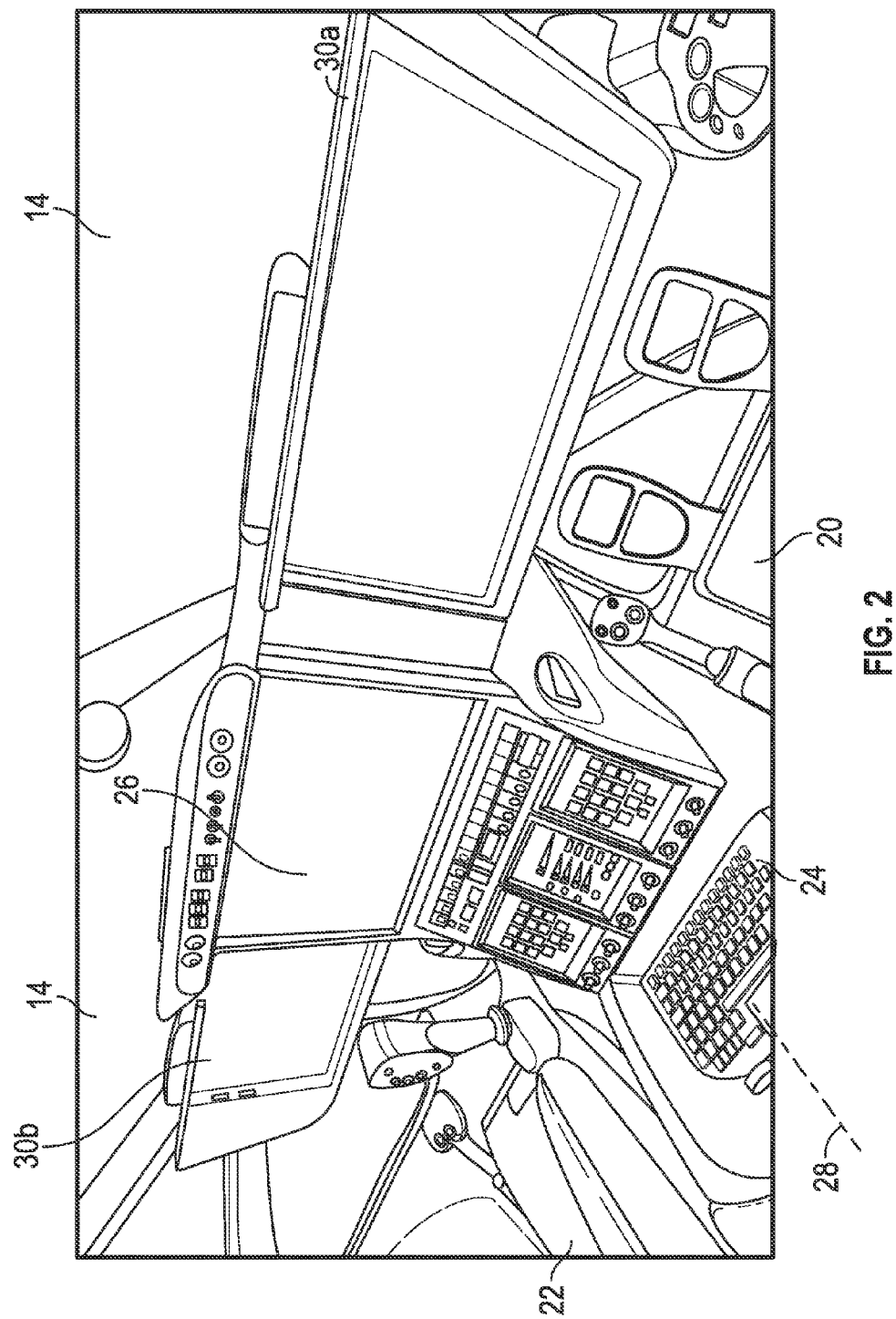
FIG. 2 is a perspective view of an embodiment of a cockpit for an aircraft.

A primary flight display (PFD) 30 extends laterally from the console 24 at each of the pilot position 20 and the copilot position 22, with PFD 30a at the pilot position 20 and PFD 30b at the copilot position 22. In FIG. 1, the PFD's 30a and 30b are located in a first position 34, such as one to satisfy instrument flight rules (IFR) requirements or other operating requirements, relative to the pilot position 20 and copilot position 22 and a design eye point 32 representing a location of a pilot when at the pilot position 20. To satisfy IFR requirements, the first position 34 is directly in front of the pilot position 20, laterally centered on the design eye point 32. When operating not under IFR conditions, but under other operating conditions, such visual flight rules (VFR) conditions, however, the first positions 34 of the PFD's 30a and 30b present an obstruction to crew external view through the windows 14. The degree of obstruction is shown in FIG. 1, and also in FIG. 2 where, in particular the obstruction of view of the pilot at the pilot position 20 by the PFD 30b located at the copilot position 22 cross-cockpit from the pilot position 20, is shown.

Figure 3:
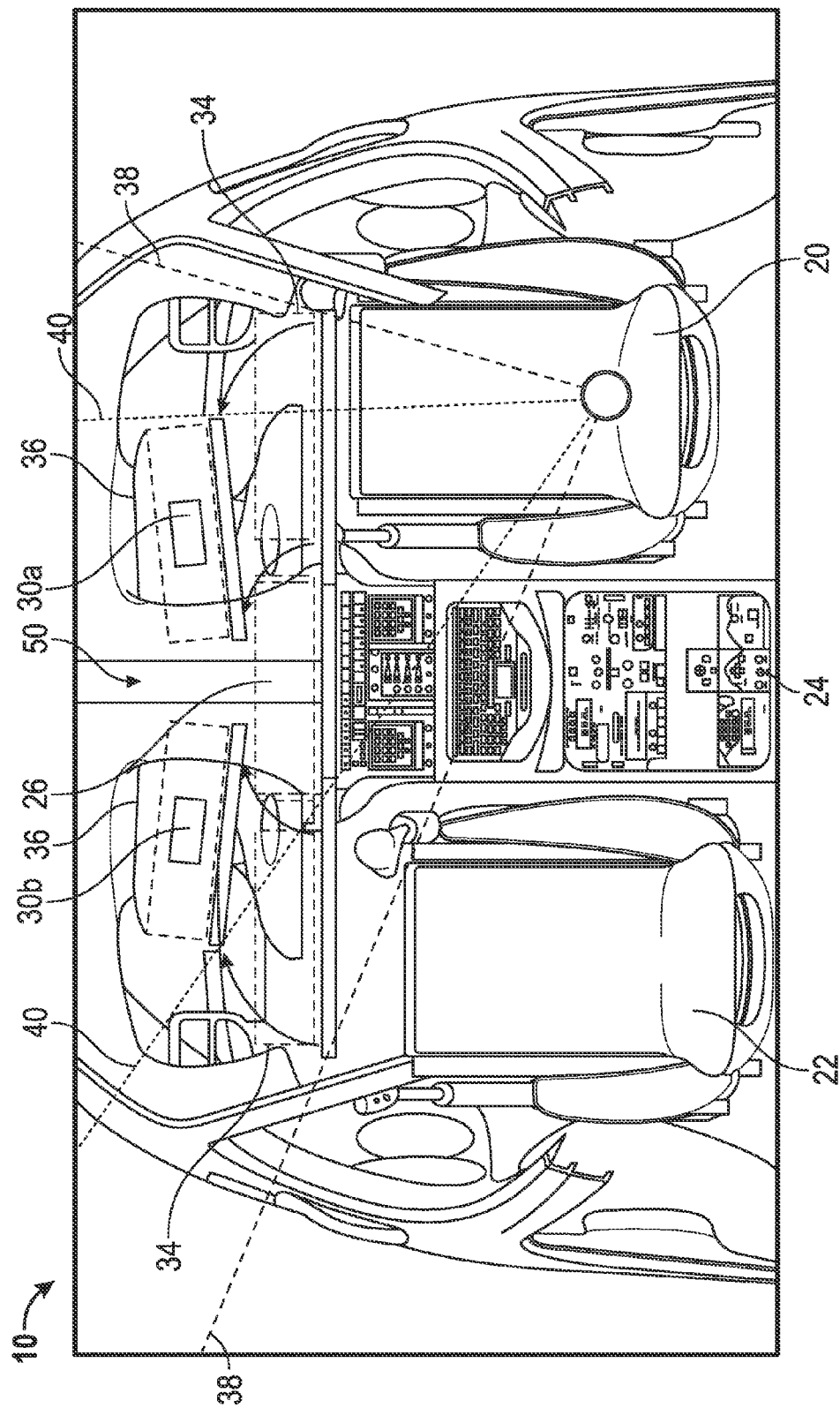
FIG. 3 is another overhead view of an embodiment of a cockpit for an aircraft.
Figure 4:
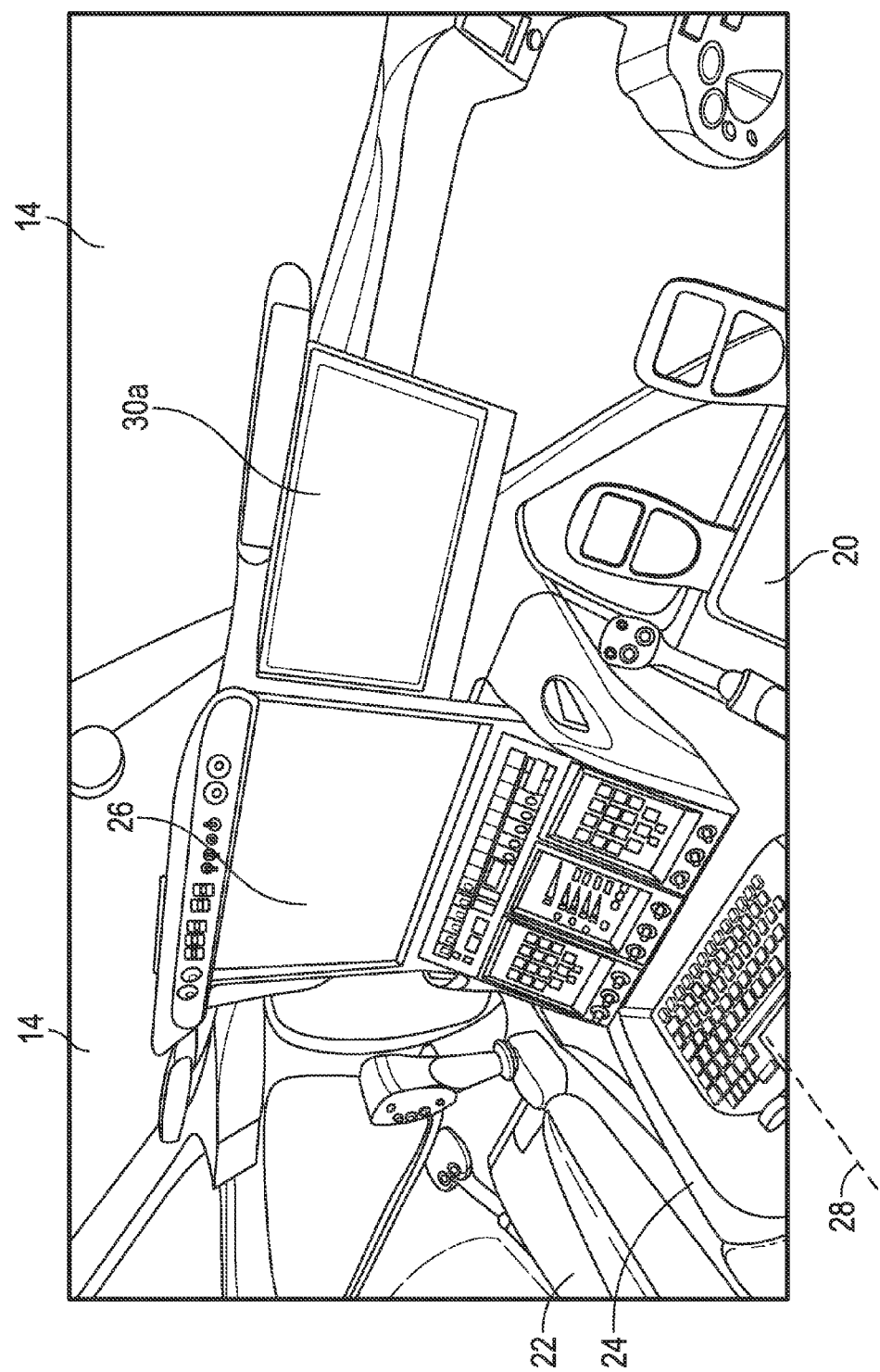
FIG. 4 is another perspective view of an embodiment of a cockpit for an aircraft.

Referring now to FIG. 3, to improve visibility and reduce obstruction of the external view when operating the helicopter 12 under VFR conditions, which occur approximately 80% of operational time, or other operating conditions, the PFD's 30a and 30b are movable from the first position 34 to a second position 36. To reach the second position 36, the PFD's 30a and 30b are moved forward and laterally toward the instrument console 24. Moving the PFD's 30a and 30b to the second position 36 greatly decreases an obstructed viewing area 38 compared to an IFR obstructed viewing area 40. Further, referring to FIG. 4, with the PFD's 30a and 30b in the second position 36, when viewed from the pilot position 20 the PFD 30b is behind the instrument console 24, thus entirely removing the PFD 30b as an obstruction from the pilot position 20. Though not shown, it is to be appreciated that when viewed from the copilot position 22, the PFD 30a is located behind the instrument console 24, thus removing the PFD 30a as an obstruction from the copilot position 22. Although forward and lateral movement of the PFD's 30a and 30b is described in this embodiment, it is to be appreciated that in other embodiments other directions of movement of the PFD's may be utilized to increase external visibility. For example, in some embodiments, the PFD's may be moved vertically, or a combination of forward and vertically. Further, although in the above description the first position and second position are discussed as applied to IFR and VFR, respectively, it is to be appreciated that the movement of the PFD's 30a and 30b may be applied to other selected operating conditions.

Figure 5:
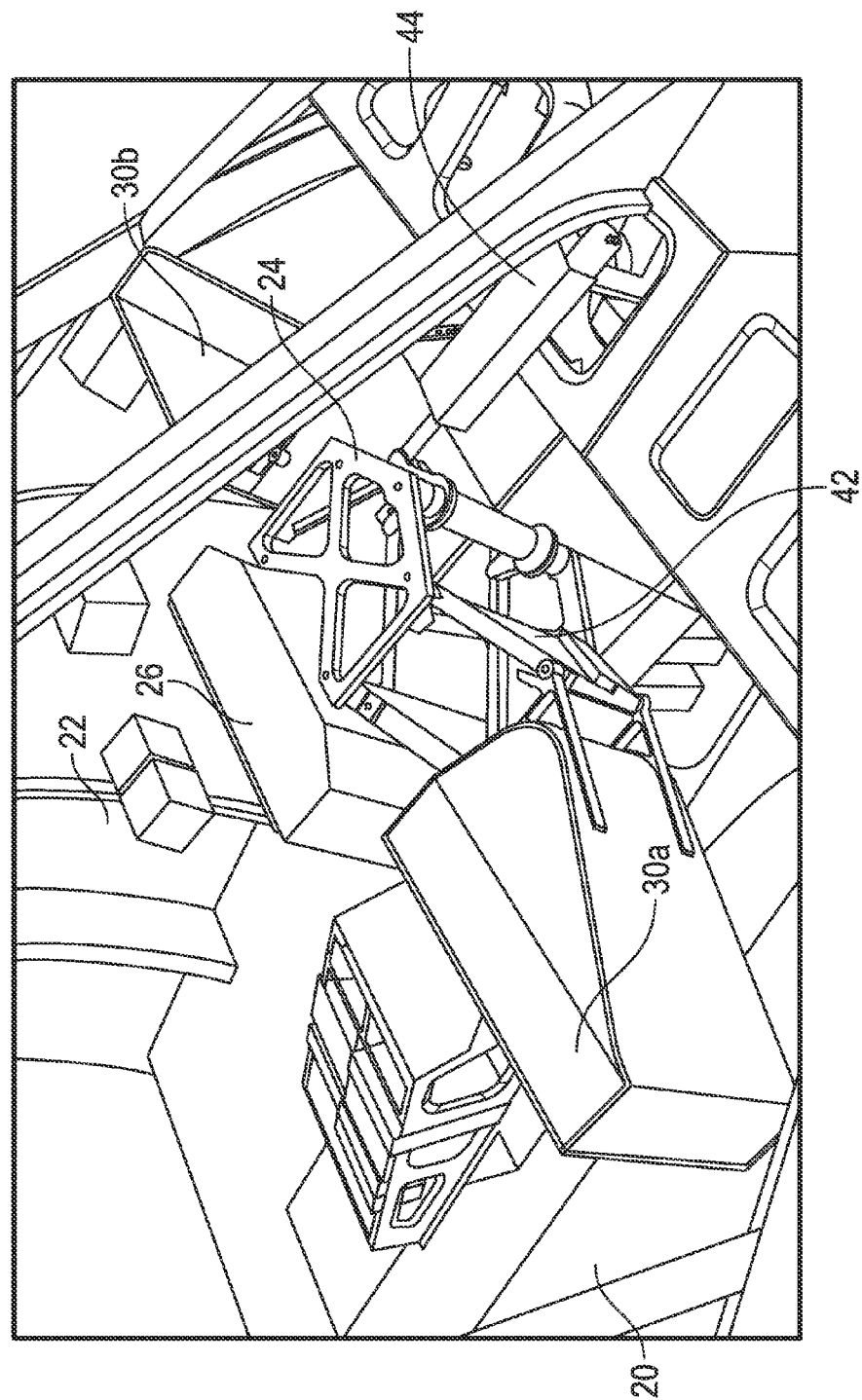
FIG. 5 is a perspective view of an embodiment of a linkage assembly for a flight display of a cockpit.

Referring now to FIG. 5, to facilitate movement of the PFD's 30a and 30b, the PFD's 30a and 30b are secured to the instrument console via a linkage assembly 42. The linkage assembly 42, in this embodiment a 4 bar linkage assembly, is configured to direct movement of the PFD's 30a and 30b between the first position 34 and the second position 36. An actuator 44 is operably connected to the linkage assembly 42. The actuator 44 receives input from the crew, through a switch or the like, to drive movement of the linkage assembly 42. When VFR operation is selected, the actuator 44 drives the linkage assembly 42 to move the PFD's 30a and 30b to the second position 36, and when IFR operation is selected, the actuator 44 drives the linkage assembly 42 to move the PFD's 30a and 30b to the first position 34. While operation via the actuator 44 is described herein, it is to be appreciated that in other embodiments other means may be used to move the PFD's 30a and 30b. For example, in some embodiments, the PFD's 30a and 30b are moved manually without aid of an actuator, and may be locked in a selected position via a pin or other device. Further, the position may be biased toward the first position 34 by, for example, a spring (not shown) such that when unlocked, the PFD's 30a and 30b return to the first position 34 from the second position 36.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A cockpit display system for a cockpit of an aircraft comprising:
   a primary flight display disposed in the cockpit and viewable from a pilot position and/or a copilot position in the cockpit; and
   a center console located between the pilot position and the copilot position, the primary flight display being movably connected to the center console;
   wherein the primary flight display is movable from a first position utilized for a first operating condition of the aircraft to a second position to increase external visibility during a second operating condition of the aircraft.

2. The cockpit display system of claim 1, wherein the primary flight display is movable via a linkage assembly connected to the primary flight display.

3. The cockpit display system of claim 2, further comprising an actuator operably connected to the linkage assembly to drive movement of the primary flight display.

4. The cockpit display system of claim 1, wherein moving the primary flight display from the first position to the second position comprises moving the primary flight display closer to the center console.

5. The cockpit display system of claim 1, wherein a primary flight display located at the copilot position is viewable from the pilot position when in the first position, but is obstructed from viewing from the pilot position by the center console when the primary flight display is in the second position.

6. A cockpit system comprising:
   a pilot operating position and a copilot operating position;
   a center console located between the pilot operating position and the copilot operating position;
   a first flight display moveably disposed in the cockpit and viewable from the pilot operating position;
   a second flight display moveably disposed in the cockpit and viewable from the copilot operating position;
   wherein the first flight display is movable from a first position utilized during a first operating condition of the aircraft to a second position to increase external visibility from the pilot operating position during a second operating condition of the aircraft; and
   wherein the second flight display is movable from a first position utilized during the first operating condition of the aircraft to a second position to increase external visibility from the pilot operating position during a second operating condition of the aircraft.

7. The cockpit system of claim 6, wherein the first flight display is movable via a linkage assembly connected to the first flight display.

8. The cockpit system of claim 7, further comprising an actuator operably connected to the linkage assembly to drive movement of the first flight display.

9. The cockpit system of claim 6, further comprising a center console located between the pilot operating position and the copilot operating position.

10. The cockpit system of claim 6, wherein the first flight display and/or the second flight display is moveably connected to the center console.

11. The cockpit system of claim 6, wherein moving the first flight display from the first position to the second position comprises moving the first flight display closer to the center console.

12. The cockpit system of claim 6, wherein a second flight display located is viewable from the pilot operating position when in the first position, but is obstructed from viewing from the pilot operating position by the center console when the second flight display is in the second position.

* * * * *